(12) United States Patent
Kousek

(10) Patent No.: US 6,950,250 B2
(45) Date of Patent: Sep. 27, 2005

(54) LIGHT BEAM RECEIVER FOR A LASER POSITIONING DEVICE

(75) Inventor: Heinz Kousek, Feldkirch (AT)

(73) Assignee: Hilti Ahtiengesellschaft, Schaan (LI)

( * ) Notice: Subject to any disclaimer, the term of this patent is extended or adjusted under 35 U.S.C. 154(b) by 477 days.

(21) Appl. No.: 10/015,002

(22) Filed: Dec. 11, 2001

(65) Prior Publication Data

US 2002/0074484 A1 Jun. 20, 2002

(30) Foreign Application Priority Data

Dec. 15, 2000 (DE) .......................... 100 62 841

(51) Int. Cl.⁷ .......................... G02B 5/04; G02B 5/08; G02B 7/18; G01C 15/02
(52) U.S. Cl. .................. 359/834; 359/850; 359/857; 359/871; 33/293
(58) Field of Search ................. 359/833, 834, 359/850, 857, 871; 33/227, 293

(56) References Cited

U.S. PATENT DOCUMENTS

| | | | | |
|---|---|---|---|---|
| 159,021 A | * | 1/1875 | Davies | 33/293 |
| 3,442,571 A | * | 5/1969 | Itzkan | 359/495 |
| 3,571,602 A | * | 3/1971 | Ohlsson et al. | 250/216 |
| 3,778,169 A | * | 12/1973 | Adams | 356/399 |
| 4,311,382 A | * | 1/1982 | Buckley et al. | 356/4.01 |
| 4,432,648 A | * | 2/1984 | Musto et al. | 356/640 |
| 4,488,809 A | * | 12/1984 | Miller et al. | 356/138 |
| 4,522,363 A | * | 6/1985 | Stuart | 248/220.21 |
| 4,915,489 A | * | 4/1990 | Minko | 359/834 |
| 4,934,780 A | * | 6/1990 | McGrath, Jr. | 359/211 |
| 4,970,794 A | * | 11/1990 | Buckley | 33/293 |
| 5,044,710 A | * | 9/1991 | Iwai et al. | 359/217 |
| 5,114,217 A | * | 5/1992 | Beiser | 359/216 |
| 5,373,360 A | * | 12/1994 | Martin et al. | 356/468 |
| 5,392,521 A | * | 2/1995 | Allen | 33/293 |
| 5,828,483 A | * | 10/1998 | Schwartz et al. | 359/216 |
| 6,178,045 B1 | * | 1/2001 | Cook et al. | 359/559 |

\* cited by examiner

*Primary Examiner*—Ricky D. Shafer
(74) *Attorney, Agent, or Firm*—Abelman, Frayne & Schwab

(57) ABSTRACT

A light beam receiver for a laser beam (2) of a laser positioning device comprising a diffuse reflection surface (3) embodies a reflection surface (3) and at least one reflector surface (4a, 4b) facing the laser beam (2) inclined at an angle ($\alpha$)<45°.

2 Claims, 1 Drawing Sheet

LIGHT BEAM RECEIVER FOR A LASER POSITIONING DEVICE

BACKGROUND OF THE INVENTION

The invention relates to a light beam receiver, particularly a hand-held passive target plate for the visible laser beam of a laser positioning device.

Such light beam receivers are used on construction sites for marking objects based on a programmed laser beam moved over a surface or radiated and for aligning the laser positioning device based on a previous marking on the object.

According to European Patent no. 508590, hand-held active target plates comprise an electro-optical sensor line with a signal emitter controlled by the alignment of the target plate with the laser beam and marking indices arranged on the edges. Such active target plates require a power source for the sensor and are, therefore, characterized by limited reliability in general activities on the construction site.

According to U.S. Pat. No. 5,818,633, hand-held passive target plates contain fresnel lens formed in a compact, transparent plastic body that visibly expand the punctuate-occurring laser beam. According to U.S. Pat. No. 5,710,647, the impinging laser beam is split by an axicon formed in the transparent plastic body and the two partial beams are displayed, via holograms, for the purpose of beam expansion, onto two component surfaces of different brightness, whereby alignment is possible respective of the brightness difference. Production of the precise, optically-active structures is relatively expensive.

SUMMARY OF THE INVENTION

The object of the present invention is to provide a simplified passive target plate for laser positioning devices.

In essence, the present invention provides a light beam receiver, which is preferably a target plate, for a visible laser beam of a laser positioning device in which, when used appropriately, the diffuse reflector surface, for visible light beams normally turned toward the laser beam, has at least one reflector surface inclined at an angle of <45° in the direction of the laser beam.

Because of this simple to manufacture inclined reflector surface, a laser beam impinging upon the surface is reflected at an obtuse angle and offset laterally by the virtual point of intersection of the laser beam with the reflection surface. The laser beam is also displayed by the diffuse reflector surface, whereby via the enlarging shift, precise fine tuning is possible with respect to the laser beams impinging upon the reflector surface.

In the preferred embodiment there are at least two reflector surfaces arranged mirror-symmetrically. Preferably, there are reflecting lateral surfaces of an equiangular [=isosceles], three-sided reflector prism, which lies with its base surface in the reflection area. Thus, a bilaterally alternating and intermittent 'hop' is observable respective of the offset, especially based on transition of the virtual intersect point at the top edge of the reflector prism and as a result of the relative movement. Such a hop corresponds to the exact position of the laser beam making precise positioning possible.

The reflector prism preferably runs on the diffuse reflection surface along a straight line. Such an arrangement makes precise positioning possible along an axis.

In a further advantageous embodiment, two such reflector prisms, each running along a straight line, intersect at a 90° angle, and thus, form a position intersect having a midpoint making positioning relative to two axes possible.

Alternatively, the reflector prism forms a three-sided, four-sided, multi sided or circular straight pyramid with the base surface in the reflection area, whereby positioning is possible relative to a point.

One or a plurality of marking indices are preferably incorporated into the extensions of the top edges and/or the reflector surfaces of the reflector prism at the outside edges of the target plate.

BRIEF DESCRIPTION OF THE DRAWINGS

The present invention is described more fully with reference to the detailed exemplary description of the invention below read together with the following drawings, in which.

DETAILED DESCRIPTION OF THE INVENTION

Figure 1:
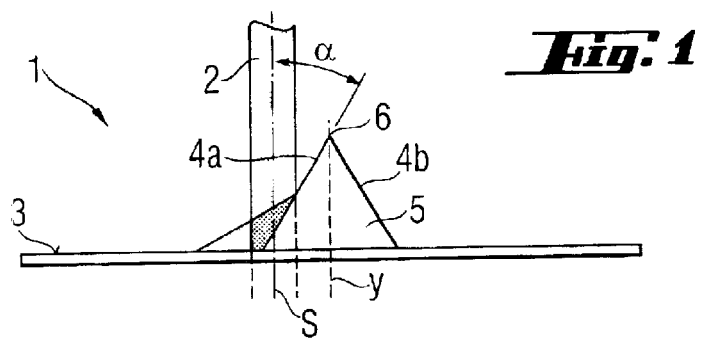
FIG. 1 is a target plate with a lateral view of a reflector prism, in accordance with the invention.
Figure 1A:
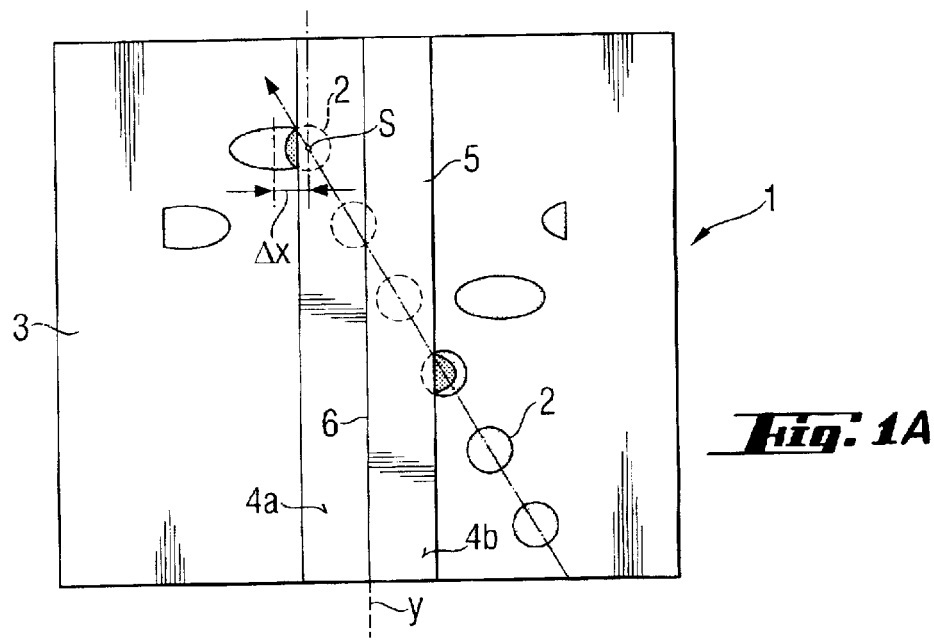
FIG. 1A is a target plate with a top view of a reflector prism, schematically illustrating a plurality of reflection figures at various beam positions, in accordance with the invention.

Referring to FIG. 1, there is shown a light beam reflector, which is depicted as a target plate 1, for a visible laser beam 2 emitted from a laser positioning device (not shown). Target plate 1 comprises a diffuse reflection surface 3 for visible light beams having rounded luminous spots and two reflector surfaces 4a and 4b mounted upstream of the diffuse reflection surface 3 and inclined at an angle α<45° to the laser beam 2. The laser beam 2 impinging upon the reflectors 4a and 4b is reflected at an obtuse angle and offset laterally by a virtual intersect point S of the laser beam 2 with the reflection surface 3 by a lateral offset Δx from the diffuse reflection surface 3. Such laser beam 2 shows up as an elliptical luminous spot. The two reflector surfaces 4a and 4b are mirror-symmetrically arranged. Both reflector surfaces 4a and 4b are embodied as reflecting lateral surfaces of an equiangular [=isosceles] triangular reflector prism 5, which lies with its base surface on the reflection surface 3 and whose top edge 6 runs along a straight line y.

Figure 2:
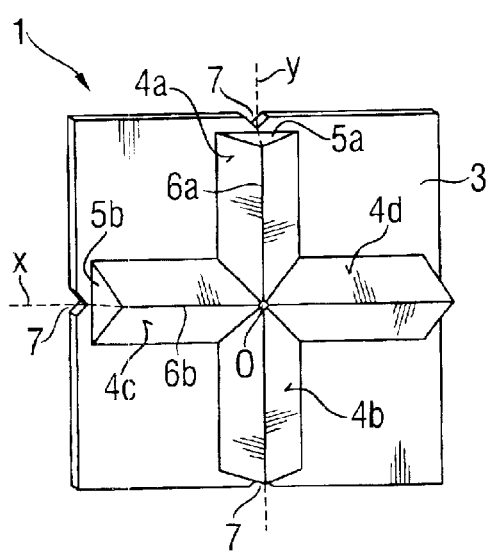
FIG. 2 is a target plate with a reflector prism depicted as a positioning cross, in accordance with the invention.

Referring to FIG. 2, two reflector prisms 5a, 5b running along straight lines x, y, respectively, intersect at a 90° angle and form a positioning cross with a midpoint 0. In the extensions of the top edges 6a, 6b of reflector prisms 5a, 5b, marking indices [lit. "notches"] 7 are incorporated on the outside edges of the target plate 1.

Figure 3:
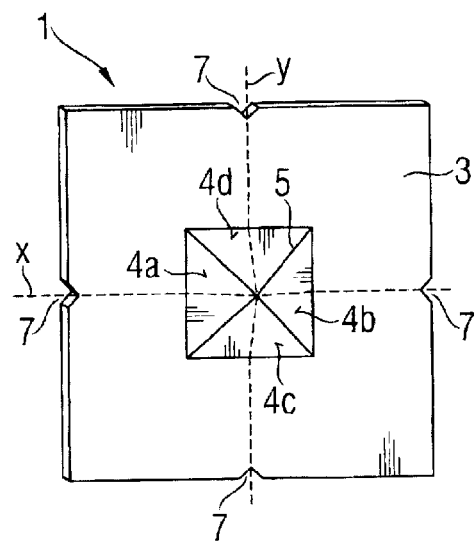
FIG. 3 is a target plate with a reflector prism depicted as a pyramid, in accordance with the invention.

Referring to FIG. 3, the reflector prism 5 forms a quadrilateral straight pyramid with its base surface on the reflection surface 3. In the extensions of the reflector surfaces 4a, 4b, 4c, 4d or the prism reflector 5, marking indices 7 are incorporated on the outside edges of the target plate 1.

What is claimed is:

1. A light beam receiver for a laser beam (2) of a laser positioning device comprising a plan reflection surface (3), wherein the plan reflection surface (3) comprises at least two reflector surfaces (4a, 4b) which are mirror-symmetrically arranged, wherein at least one reflector surface of said at least two reflector surfaces (4a, 4b) is inclined towards the laser beam (2) at an angle (α) of less than 45°, wherein the at least two reflector surfaces (4a, 4b) are reflecting lateral surfaces of a reflector prism (5), wherein the reflector prism (5) forms one of a trilateral, quadrilateral, multilateral and round straight pyramid having a base surface on the plan reflection surface (3).

2. A light beam receiver for a laser beam (2) of a laser positioning device comprising a plan reflection surface (3), wherein the plan reflection surface (3) comprises at least two reflector surfaces (4a, 4b) which are mirror-symmetrically arranged, wherein at least one reflector surface of said at least two reflector surfaces (4a, 4b) is inclined towards the laser beam (2) at an angle (α) of less than 45°, wherein the at least two reflector surfaces (4a, 4b) are reflecting lateral surfaces of a first reflector prism (5), wherein the first reflector prism (5a) forms a top edge (6a) along a first straight line (y), and wherein a second reflector prism (5b) forms a top edge (6b) along a second straight line (x) which intersects said first reflector prism (5a) at an angle of 90° at a midpoint (0).

* * * * *